Aug. 3, 1943.   A. MERDAN   2,326,050
MOTOR ANTIFREEZE DEVICE
Filed Oct. 22, 1941   2 Sheets-Sheet 1

INVENTOR.
Alexander Merdan
BY
ATTORNEY

Aug. 3, 1943.  A. MERDAN  2,326,050
MOTOR ANTIFREEZE DEVICE
Filed Oct. 22, 1941  2 Sheets-Sheet 2
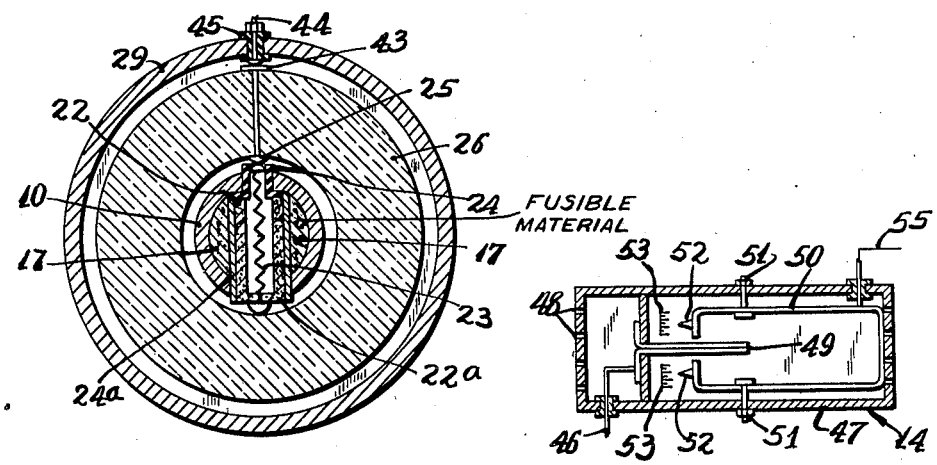
Fig. 5.  Fig. 6.
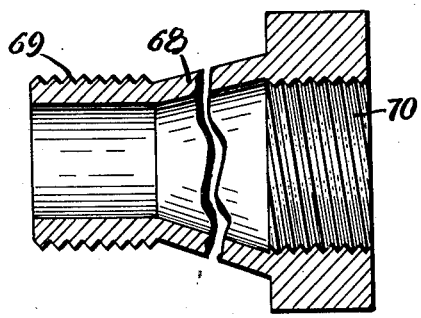 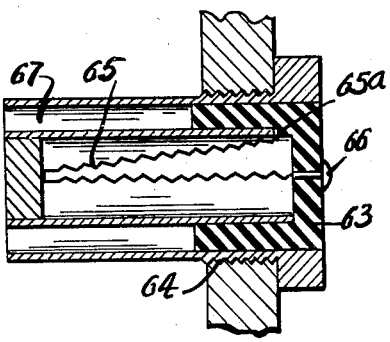
Fig. 7.  Fig. 8.
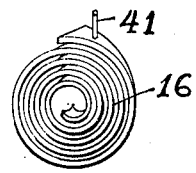
Fig. 4A.
INVENTOR.
Alexander Merdan
BY
ATTORNEY Patented Aug. 3, 1943

2,326,050

UNITED STATES PATENT OFFICE 2,326,050

MOTOR ANTIFREEZE DEVICE

Alexander Merdan, New York, N. Y.

Application October 22, 1941, Serial No. 416,051

7 Claims. (Cl. 123—174)

This invention relates to new and useful improvements in a motor anti-freeze service.

More specifically, the invention proposes a device as mentioned which is intended to be used in emergency only to prevent the freezing of a liquid cooled motor. A construction is proposed which may be made operative at will according to the discretion of the user, and which will drain the liquid from the cooling system of a motor in the event that the temperature falls below a predetermined amount. The device is particularly intended for overnight storage of motors, or storage at other periods when they are not being watched.

Still further the invention proposes to characterize the motor anti-freeze device by a discharge connected with the water or liquid jacket of the motor, fusible material normally closing said discharge, and an arrangement whereby the fusible material is melted in the event that the temperature falls below the predetermined degree so that the water or liquid may drain out through the discharge.

The invention proposes a construction in which there is a wound spring held from unwinding by the fusible material, and in which said spring connects with a switch for turning off the circuit of a heater capable of melting the fusible material after the heater is set into operation by a thermostat control means.

Still further the invention proposes the construction of a heating plug which may be used in conjunction with the water jacket of a motor to heat the water of liquid to prevent freezing, when this is desired.

For further comprehension of this invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4A is a perspective view of the spring per se.

Fig. 5 is a vertical sectional view taken on the line 5—5 of Fig. 2.

Fig. 6 is a transverse vertical sectional view of the thermostat shown in Fig. 1.

Fig. 7 is a longitudinal sectional view of an adapter for the motor anti-freeze device shown in Fig. 2.

Fig. 8 is a sectional view of a heater for engagement through the water jacket of a motor for heating the water thereof.

Figure 1:
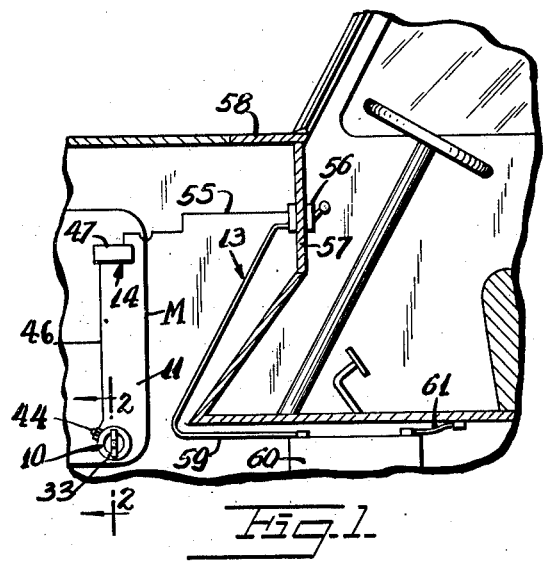
Fig. 1 is a fragmentary sectional view of an automobile provided with a water cooled motor and an anti-freeze device constructed in accordance with this invention.
Figure 3:
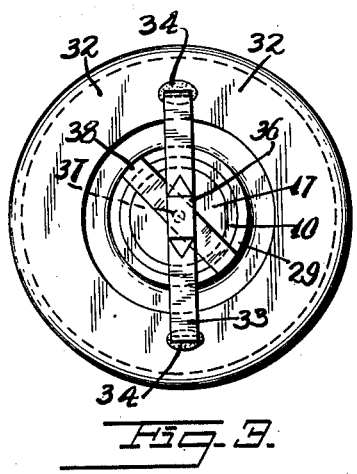
Fig. 3 is an elevational view of Fig. 2 looking from the right hand side.
Figure 2:
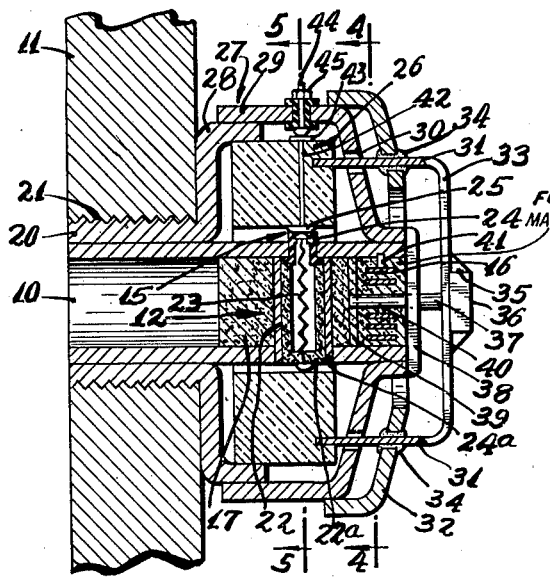
Fig. 2 is a fragmentary enlarged sectional view taken on the line 2—2 of Fig. 1.
Figure 4:
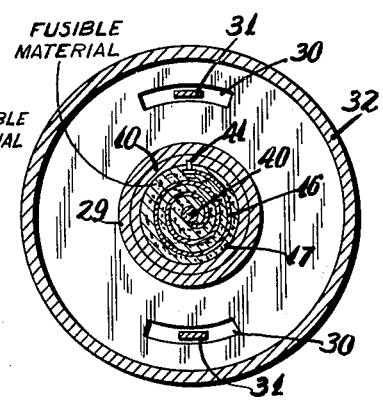
Fig. 4 is a vertical sectional view taken on the line 4—4 of Fig. 2.

The motor anti-freeze device, in accordance with this invention, includes a discharge 10 adapted to be mounted on the water jacket 11 of a water cooled motor M.

An electric heater 12 which is normally not operating is mounted within the discharge 10 in such a way as to not completely block the discharge. The electric heater 12 is arranged in an electric circuit 13 which is normally open and which when closed is capable of operating the heater 12. A thermostat 14 is arranged to close a circuit 13 when a certain temperature of the atmosphere is reached.

The circuit 13 also includes a switch 15 capable of opening the circuit 13 after it has been closed by the thermostat 14. The switch 15 is associated with means for opening it, which means includes a spring 16 normally in a wound condition. This spring 16 is located within the discharge 10. Fusible material 17, such as lead, certain compositions of waxes, etc., is located within the discharge 10 and normally blocks the discharge so that the water from the water jacket 11 cannot seep out, and the fusible material also holds the spring 16 from unwinding. The material 17 has such characteristics that it will melt when the heater 12 operates.

The discharge 10 is in the nature of a tube which has a collar 20 fixedly mounted thereon. This collar 20 is provided with threads 21 by which it is threadedly mounted through a tapped opening in the water jacket 11. The electric heater 12 comprises a ferrule 22, which is mounted transversely through the discharge tube 10. A heating filament 23 is mounted through the ferrule 22 preferably of lead material which is surrounded by suitable metallic tubing 24ᵃ. One end of the filament 23 is attached to an end portion 22ᵃ which closes one end of the ferrule 22. The other end of the filament 23 connects with a contact 24, which is insulated from the device. This contact 24 is cooperative with a contact 25 mounted on an annular insulation member 26 turnably mounted around the discharge tube 10. The contacts 24 and 25 comprise the switch 15. Normally, the contacts 24 and 25 engage each other, but as heat from the heater 23 melts the fusible material 17 the tension of the spring 16 will turn the insulation member 26 to disengage the contact 25 from the contact 24 and open the switch 15.

The annular member of insulation material 26 is turnably mounted within a casing 27. This casing 27 is formed by a flange 28 which continues from the collar 20, and a tubular member 29 which is mounted on the flange 28 and which is also mounted on the outer end of the discharge tube 10. The casing member 29 has several arcuate slots 30 through which fingers 31 engage. These fingers 31 connect with the annular member 26 for turning the member 26 to open the switch 15. The fingers 31 extend through a cap 32 which is turnably mounted on the casing member 29. The fingers 31 continue into a strip 33 which extends diametrically across the discharge tube 10. The fingers 31 are connected with the cap 32 by solder 34 or other binding substance.

The strip 33 is secured by solder 35 to the head 36 of a stem 37 which is rotatively supported on a transverse strip 38 from the casing member 29, and on another transverse strip 39 fixedly mounted in the discharge tube 10. The spring 16 is coaxially mounted around the stem 37 and has one end 40 attached to the rotatively supported stem and its other end 41 attached to the stationary casing member 29 to cause the tension of the spring 16 to turn the stem when it is freed.

The contact 25 connects with a lead 42 which extends through the annular insulation member 26 and connects with a contact 43 mounted on the periphery thereof. The contact 43 is engaged by a contact 44 mounted through an insulation member 45 which in turn is mounted through one side of the casing member 29. The contact 44 connects with a lead 46, see Fig. 1, which forms a part of the circuit 13.

The lead 46 connects with a portion of a bimetal member mounted within the thermostat 14 as shown in Fig. 6 and hereinafter described. The thermostat 14 comprises a casing 47 formed with perforations 48 through which the atmosphere may reach the interior thereof. Within the casing 47 there is a bimetal member 49 which is engageable with the ends of a contact strip 50. The ends of this contact strip 50 tend to move towards each other due to the inherent resiliency of the contact strip. They are held in spaced positions by adjustment screws 51 mounted on the sides of the casing 47. Each of the ends of the contact strip 50 are provided with pointers 52 each of which works across a scale 53 formed on the casing 47. The arrangement is such that the screws 51 may be turned to move the ends of the contact strips 50 to positions indicated by the pointers 52 and the scales 53 so as to set the thermostat to function at predetermined temperatures.

The contact 50 of the thermostat 14 connects with a lead 55 which connects with one terminal of the thermostat 14 mounted on the dashboard 57 of the automobile 58 which is provided with the said motor M. The other contact of the switch 56 is connected by a lead 59 to the high tension terminal of the battery 60. The other terminal of the battery 60 is provided with a ground 61. The filament 23 of the heater 12 is also grounded by being connected with the end 22 which is connected with the discharge 10 and the collar 20 which is grounded to the water jacket 11.

In Fig. 7 an adaptor is shown, comprising a tube having external threads 69 for engaging a tapped opening in a water jacket and internal threads 70 for receiving the threads 21.

In Fig. 8 a plug type of heater is shown which is capable of heating the water of the cooling system of a motor or other device. This heater has a body portion 63 of insulation material supporting a shell contact 64 adapted to threadedly engage in an opening of a water jacket or the like. A heating filament 65 is mounted within the casing 63 and has one end 65 connected with the shell contact 64 and the other end connected with a central contact 66. The body 65 has an annular recess 67 extended inwards from its inner end and in which the water may engage to place the water in closer relationship with the heating filament 65.

The operation of the device is as follows:

When the operator of the vehicle believes that the temperature will fall below the freezing point of the water, or the freezing point of the liquid of the liquid cooling system, he merely closes the switch 56. Then the motor may be left in safety. Should the temperature fall below the predetermined amount the thermostat 14 will close the circuit 13 which then operates the heater 12. The heater will melt the fusible material 17 which flows out from the discharge 10. This releases the spring 16 and frees the water or liquid which may flow out of the discharge 10.

When the spring 16 is freed it unwinds and turns the stem 37 which in turn moves the strip 33 so that the fingers 31 turn the annular member 26 to disengage the contacts 24 and 25 of the switch 15. This opens the switch 15 and shuts off the current through the heater 23. The water or liquid flows out from the discharge 10 and thus is prevented from freezing within the cooling system of the motor.

If desired, heaters such as illustrated in Fig. 8 may be engaged on the water jacket of the motor and connected with a suitable electric circuit, of supplying heat to maintain the liquid above freezing. This is an alternate system to that of discharging the liquid before it freezes.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A motor anti-freeze device, comprising a discharge for the water jacket of a motor, an electric heater within said discharge, an open electric circuit for operating said heater when closed, a thermostat for closing said circuit when a certain temperature is reached, a switch for opening said circuit when closed by said thermostat, means for operating said switch and including a wound spring in said discharge, and fusible material in said discharge for blocking said discharge and holding said spring from unwinding and adapted to melt upon operation of said heater.

2. A motor anti-freeze device, comprising a discharge for the water jacket of a motor, an electric heater within said discharge, an open electric circuit for operating said heater when closed, a thermostat for closing said circuit when a certain temperature is reached, a switch for opening said circuit when closed by said thermostat, means for operating said switch and including a wound spring in said discharge, and fusible material in said discharge for blocking said discharge and holding said spring from unwinding and adapted to melt upon operation of said heater, said discharge being in the form of a tube and being provided with a threaded section by which it may be threadedly engaged through said water jacket.

3. A motor anti-freeze device, comprising a discharge for the water jacket of a motor, an electric heater within said discharge, an open electric circuit for operating said heater when closed, a thermostat for closing said circuit when a certain temperature is reached, a switch for opening said circuit when closed by said thermostat, means for operating said switch and including a wound spring in said discharge, and fusible material in said discharge for blocking said discharge and holding said spring from unwinding and adapted to melt upon operation of said heater, said electric heater comprises a tube mounted transversely through said discharge and having an internal heating filament.

4. A motor anti-freeze device, comprising a discharge for the water jacket of a motor, an electric heater within said discharge, an open electric circuit for operating said heater when closed, a thermostat for closing said circuit when a certain temperature is reached, a switch for opening said circuit when closed by said thermostat, means for operating said switch and including a wound spring in said discharge, and fusible material in said discharge for blocking said discharge and holding said spring from unwinding and adapted to melt upon operation of said heater, said electric heater comprises a tube mounted transversely through said discharge and having an internal heating filament, and said electric circuit being connected to operate said filament.

5. A motor anti-freeze device, comprising a discharge for the water jacket of a motor, an electric heater within said discharge, an open electric circuit for operating said heater when closed, a thermostat for closing said circuit when a certain temperature is reached, a switch for opening said circuit when closed by said thermostat, means for operating said switch and including a wound spring in said discharge, and fusible material in said discharge for blocking said discharge and holding said spring from unwinding and adapted to melt upon operation of said heater, said switch comprising a pair of contacts one of which is mounted on an annular insulation member which is capable of turning.

6. A motor anti-freeze device, comprising a discharge for the water jacket of a motor, an electric heater within said discharge, an open electric circuit for operating said heater when closed, a thermostat for closing said circuit when a certain temperature is reached, a switch for opening said circuit when closed by said thermostat, means for operating said switch and including a wound spring in said discharge, and fusible material in said discharge for blocking said discharge and holding said spring from unwinding and adapted to melt upon operation of said heater, said switch comprising a pair of contacts one of which is mounted on an annular insulation member which is capable of turning, and said spring being connected with means for operating said switch.

7. A motor anti-freeze device, comprising a discharge for the water jacket of a motor, an electric heater within said discharge, an open electric circuit for operating said heater when closed, a thermostat for closing said circuit when a certain temperature is reached, a switch for opening said circuit when closed by said thermostat, means for operating said switch and including a wound spring in said discharge, and fusible material in said discharge for blocking said discharge and holding said spring from unwinding and adapted to melt upon operation of said heater, said fusible material being a low melting point lead.

ALEXANDER MERDAN.